US009886861B2

(12) United States Patent
Shamasundar et al.

(10) Patent No.: US 9,886,861 B2
(45) Date of Patent: Feb. 6, 2018

(54) VALIDATING AIR TRAFFIC CONTROL MESSAGES DURING THE COURSE OF FLIGHT

(71) Applicant: Honeywell International Inc., Morristown, NJ (US)

(72) Inventors: Raghu Shamasundar, Karnataka (IN); Thomas D. Judd, Woodinville, WA (US); Xiaozhong He, Laurel, MD (US)

(73) Assignee: Hoenywell International Inc., Morris Plains, NJ (US)

( * ) Notice: Subject to any disclaimer, the term of this patent is extended or adjusted under 35 U.S.C. 154(b) by 176 days.

(21) Appl. No.: 14/809,445

(22) Filed: Jul. 27, 2015

(65) Prior Publication Data

US 2017/0076611 A1 Mar. 16, 2017

(51) Int. Cl.
*G01C 21/00* (2006.01)
*G01C 23/00* (2006.01)
*G08G 5/00* (2006.01)

(52) U.S. Cl.
CPC .......... *G08G 5/0013* (2013.01); *G08G 5/003* (2013.01); *G08G 5/0047* (2013.01)

(58) Field of Classification Search
CPC ..... G08G 5/0013; G08G 5/0047; G08G 5/003
USPC .......................................................... 340/971
See application file for complete search history.

(56) References Cited

U.S. PATENT DOCUMENTS 6,313,759 B1 * 11/2001 Musland-Sipper .. G08G 5/0013 340/945
6,828,921 B2 12/2004 Brown et al.
7,979,199 B2 7/2011 Judd et al.
8,321,069 B2 11/2012 Vasek et al.
8,332,133 B2 12/2012 Ferro et al.
8,694,184 B1 * 4/2014 Boorman ............... G01C 23/00 340/945
8,849,476 B2 9/2014 Coulmeau
9,032,319 B1 * 5/2015 Hammack ............ G06F 3/0486 715/769
9,159,241 B1 * 10/2015 Murphy .................. G08G 5/02
(Continued)

OTHER PUBLICATIONS

Prevot et al., "Flight Crew Support for Automated Negotiation of Descent and Arrival Clearances", Proceedings of the Ninth International Symposium on Aviation Psychology, 1997, pp. 18, Published in: Columbus, OH.

*Primary Examiner* — Tanmay Shah
(74) *Attorney, Agent, or Firm* — Fogg & Powers LLC

(57) ABSTRACT

A system and method for dynamically validating uplink messages during flight are provided. The system comprises at least one processing unit in an aircraft, and at least one communication device in the aircraft that is operatively connected to the processing unit. The communication device is configured to receive uplink messages from a ground air traffic control (ATC) center, and transmit downlink messages to the ground ATC center. The system also includes a human machine interface (HMI) in the aircraft that is operatively connected to the processing unit. The HMI is configured to receive input from a user and display information to the user. One or more data sources that provide dynamic information are in operative communication with the processing unit. The processing unit is configured to determine whether an ATC uplink message is acceptable based on analysis of the dynamic information from the one or more data sources.

20 Claims, 10 Drawing Sheets

(56) References Cited

U.S. PATENT DOCUMENTS

2002/0004698 A1* 1/2002 Lai .......................... G01S 13/765 701/120
2006/0135070 A1* 6/2006 Karabinis .......... H04B 7/18513 455/63.1
2007/0126621 A1* 6/2007 Sandell ................ G08G 5/0013 342/36
2007/0129854 A1* 6/2007 Sandell ................ G08G 5/0013 701/3
2008/0065275 A1* 3/2008 Vizzini ................ G05D 1/0016 701/2
2008/0154486 A1* 6/2008 Coulmeau ............ G08G 5/0013 701/120
2011/0032123 A1* 2/2011 McGuffin ............. G08G 5/0013 340/961
2011/0118908 A1* 5/2011 Boorman ............. G08G 5/0021 701/14
2011/0246053 A1 10/2011 Coulmeau et al.
2011/0270992 A1* 11/2011 Judd .................... G08G 5/0021 709/227
2012/0054641 A1* 3/2012 Sae-Chim ............. G06F 3/0489 715/752
2012/0086868 A1* 4/2012 Takaya ................. H04N 5/4403 348/734
2012/0271616 A1* 10/2012 Ludwig ..................... G06F 3/14 703/28
2013/0013133 A1* 1/2013 Walter ................. G08G 5/0021 701/11
2013/0090786 A1* 4/2013 Judd ........................ H04L 67/12 701/3
2014/0278037 A1* 9/2014 Choksi ................... G08G 5/065 701/120
2014/0320417 A1 10/2014 Pakki et al.
2014/0336915 A1* 11/2014 Pakki ................... G08G 5/0013 701/120
2015/0213720 A1* 7/2015 Axtell .................. G08G 5/0013 701/120
2016/0019794 A1* 1/2016 Dominic .............. G08G 5/0013 701/484
2016/0125744 A1* 5/2016 Shamasundar ...... G08G 5/0039 701/122

* cited by examiner

VALIDATING AIR TRAFFIC CONTROL MESSAGES DURING THE COURSE OF FLIGHT

BACKGROUND

During the course of a flight, a pilot receives many uplinked messages from an air traffic controller depending on different parameters and conditions. The controller basically sends any required data to the aircraft to fly in a safer zone. For example, the controller can ask the pilot to fly the aircraft at a particular altitude, speed, heading, or the like. Such constraints defined by the controller are uplinked through datalink communications, and are then inserted or loaded into the active flight plan in the aircraft.

When an air traffic control (ATC) uplink message is sent to an aircraft, the uplink message is statically validated (format, range of values, etc.) and may be loaded automatically when received or after acceptance by the pilot, depending on the aircraft system architecture. In some cases, loading can include a flight plan system static validation such as by a flight management system (FMS). After the uplink message is accepted, an acknowledgement indicating acceptance is sent to the controller. As the pilot can load an uplink message at any point after acceptance, any elapsed time can change the conditions applicable to the uplink message.

SUMMARY

A system and method for dynamically validating uplink messages during flight are provided. The system comprises at least one processing unit in an aircraft, and at least one communication device in the aircraft that is operatively connected to the processing unit. The communication device is configured to receive uplink messages from a ground air traffic control (ATC) center, and transmit downlink messages to the ground ATC center. The system also includes a human machine interface (HMI) in the aircraft that is operatively connected to the processing unit. The HMI is configured to receive input from a user and display information to the user. One or more data sources that provide dynamic information are in operative communication with the processing unit. The processing unit is configured to determine whether an ATC uplink message is acceptable based on analysis of the dynamic information from the one or more data sources.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which.

DETAILED DESCRIPTION

Figure 1:
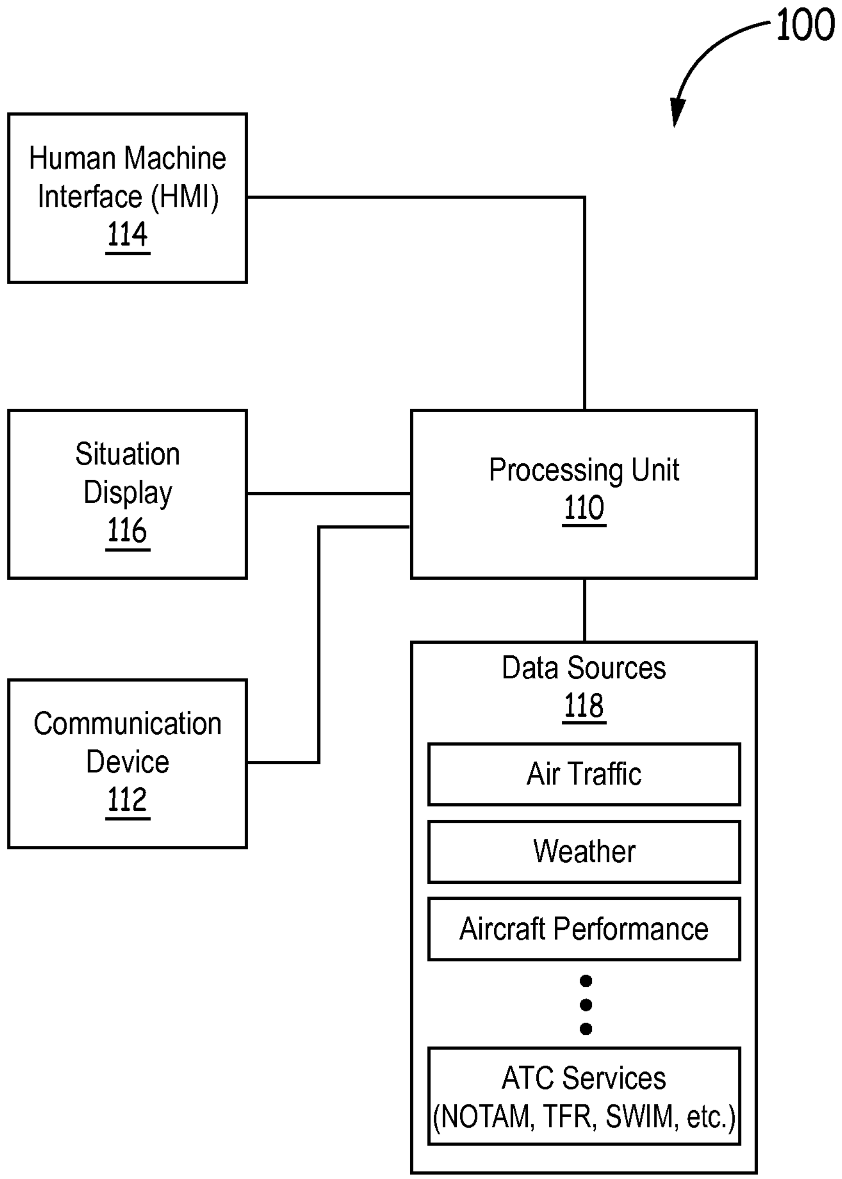
FIG. 1 is a block diagram of a system for validating uplink messages during flight of an aircraft, according to one embodiment.

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

A system and method is provided for dynamically validating uplink messages such as air traffic control (ATC) messages during the course of an aircraft flight. As a time elapsed condition with respect to inside or outside of the aircraft can change, the present system provides dynamic validation of uplink information with a mechanism that uses dynamic information and any constraints restriction in the validation process.

The present approach provides for dynamically validating uplink messages received by an aircraft using dynamic data to determine if it is suitable (e.g., safe, efficient, or acceptable) to execute one or more uplink constraints in the uplink messages. Exemplary uplink constraints that can be executed for the aircraft include a new altitude, a new speed, a new direction, a new route (e.g., FMS flight planning), and the like, or any combination of constraints. If acceptable, the one or more uplink constraints are executed into a flight plan of the aircraft, a mode control panel, or the like.

The present method can be implemented as separate logic in at least one processing unit located in the aircraft. For example, the processing unit can be part of a flight management system (FMS), a communication management function (CMF), or a communications management unit (CMU), located in the aircraft.

The processing unit takes inputs from various sources of dynamic information, including the flight plan, aircraft location, any requested changes to the flight plan from ATC, weather (e.g., directly from radar, or from a separate ground link), and the like. The dynamic information aids in providing accurate feedback, allowing the present method to determine if the uplink message is acceptable, or if an alternate change is necessary. The uplink message can include, for example, one or more of a requested course, altitude, heading, or speed for the aircraft.

For example, when an aircraft is flying between waypoints, the processing unit analyzes the received dynamic information, and predicts whether an uplink constraint is acceptable in view of the current information. A visual indication is then shown on a human machine interface (HMI) as to whether the uplink constraint is acceptable or unacceptable. If acceptable, the uplink constraint is safe to be loaded and executed into a flight plan of the aircraft, a mode control panel, or the like. If the uplink constraint is not acceptable, the processing unit predicts and generates a suitable downlink request for a new constraint that can be sent to the ground center by the pilot for approval.

The present approach is particularly useful in cases where ATC messages age as the flight progresses. For example, if a potential weather issue arises based on radar information, the present system can determine a suitable alternative to get around the weather issue. In addition, a request from the pilot to ATC can be automatically set up by the present system, such as to keep the current flight plan or change to a different flight plan, thereby reducing required communications during the flight.

The present method can be employed in connected aircraft scenarios (connected Wx, for example) where a more dynamic aircraft-side decision making process is needed. As the airline industry is moving from ATC to ATM (Air Traffic Manager), the method can be implemented as part of ATM.

In another aspect, the present system and method also provide for rendering of uplink or downlink messages on a situation display in the aircraft. For example, when an initial ATC uplink is accepted by the pilot, the HMI can show the text of the uplink information that is pending and waiting to be executed. An associated situation display in the aircraft can show the pending uplink information with a distinguishing color and/or symbology, indicating that the ATC uplink is pending and needs pilot action. In one implementation, an uplink constraint value can be shown on the situation display against any existing constraint value with a particular color and indication to the pilot that the constraint value is yet to be executed. Adding any pending constraints to the situation display helps the pilot to view the pending constraints along with existing data. In another embodiment, a visual representation can be rendered on the situation display showing that an uplink message is acceptable or unacceptable.

As the pilot views the situation display at regular intervals, providing graphical and/or textual indications with defined symbology of pending constraints enables the pilot to not miss any constraints that need to be executed into an active flight plan, thereby helping to increase situational awareness. Providing the pilot with such awareness when viewing the situation display produces a more robust navigation system.

Further details of the present system and method are described hereafter with reference to the drawings.

FIG. 1 illustrates one embodiment of a system 100 that can be employed to validate messages during flight of an aircraft. The system 100 generally includes at least one processing unit 110, which is operatively connected to at least one communication device 112 in the aircraft, a human machine interface (HMI) 114, a situation display 116, and one or more data sources 118 that provide dynamic information.

The processing unit 110 can be implemented in an FMS, CMF, CMU, or other independent system in the aircraft. The processing unit 110 includes or functions with software programs, firmware, or other computer readable instructions for carrying out various methods, process tasks, calculations, and control functions, which are used in providing aerospace message screens to a user and transmitting user selected messages as described herein.

The communication device 112 can be a radio transceiver, or a communication management unit in the aircraft that is connected to a communication radio (i.e., transceiver). The communication device 112 is configured to receive uplink messages from a ground ATC center, and transmit downlink messages to the ground ATC center. For example, communication device 112 can be used to communicate Controller Pilot Data Link Communications (CPDLC) messages between the ATC center and the aircraft.

The HMI 114 is located in the aircraft cockpit and is configured to receive input from a user such as a pilot, and display information to the user. The HMI 114 can be a control display unit (CDU), a multifunction control and display unit (MCDU), a multi-input interactive display unit (MIDU), or a multi-function display (MFD), for example. The HMI 114 can display various uplink, downlink, and system generated messages. The HMI 114 enables a user to navigate an onscreen menu structure, to respond to messages and/or to enter data.

The situation display 116 is also located in the aircraft cockpit, and is configured to generate a visual representation of a flight plan of the aircraft, as well as provide additional flight information. The situation display 116 can be, for example, a navigation display, a vertical situation display, or the like.

The data sources 118 for providing dynamic information include sources of weather data, air traffic data, fuel data, aircraft performance data, active flight plan data, or the like. Other exemplary sources of dynamic information include various ATC services such as digital Notice to Airmen (NOTAM), Temporary Flight Restriction (TFR), System Wide Information Management (SWIM), 4D Flight Plan Data (4D), 4D Trajectory Data Link (4D TRAD), Traffic Collision Avoidance System (TCAS), Automatic Dependency Surveillance-Broadcast (ADS-B), digital Flight Information Service (D-FIS), Terminal Weather Information for Pilots (TWIP), Digital Automatic Terminal Information Service (D-ATIS), reduced vertical separation minimum data, as well as any other available dynamic information.

In one embodiment, processing unit 110 is configured to determine whether an uplink constraint is acceptable based on analysis of the dynamic information from data sources 118. For example, when the aircraft is flying between waypoints, the processing unit 110 compares actual and predicted weather information, air traffic data, and other dynamic information, and predicts whether the uplink constraint is acceptable against the current information. A visual indication is then displayed on HMI 114 as to whether the uplink constraint is acceptable or not. If acceptable, the uplink constraint can be executed. If the uplink constraint is not acceptable, processing unit 110 predicts and generates a suitable downlink request for a new constraint that can be sent to the ATC center by the pilot for approval.

Figure 2:
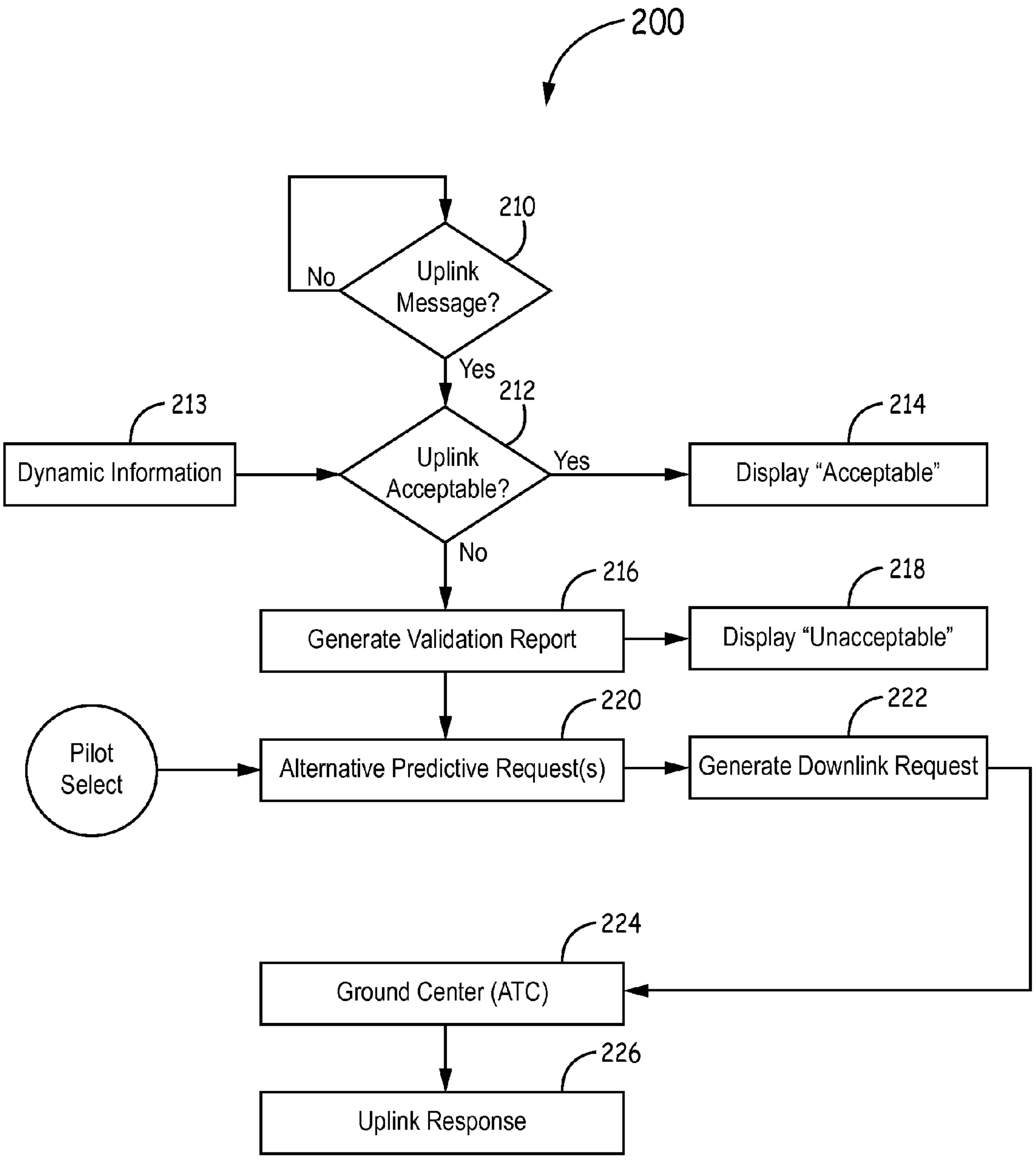
FIG. 2 is a flow diagram of a method for validating uplink messages during flight of an aircraft, according to one embodiment.

In another embodiment, processing unit 110 can be configured to generate a visual representation on situation display 116 of a pending uplink constraint that is cleared for executing into the flight plan of the aircraft. The processing unit 110 can also generate a visual representation on situation display 116 of a downlink request sent to the ATC center. This embodiment can be employed with, or separately from, the embodiment for validating messages during flight of an aircraft FIG. 2 is a flow diagram of a method 200 that can be implemented by system 100 to validate uplink messages during flight of the aircraft. When an uplink message is received by the aircraft (block 210), from a ground center such as an ATC center, a determination is made by processing unit 110 whether the uplink message is acceptable (block 212). The validity determination is made based on dynamic information (block 213) received by processing unit 110 from the one or more data sources 118. If the uplink message is determined to be acceptable, the HMI 114 displays an indication to the pilot that the uplink message is acceptable to execute, such as "ACCEPTABLE" (block 214). The pilot can then proceed with pushing a button or key on HMI 114 to execute the instructions in the uplink message.

If the uplink message is determined to be unacceptable, a validation report is generated (block 216) and shown on HMI 114. The validation report includes a visual indication to the pilot that the uplink message is not acceptable to execute, such as "UNACCEPTABLE" (block 218). One or more alternative predictive requests are also displayed (block 220) for selection by the pilot to be sent to the ground center. A downlink request is then generated (block 222) by processing unit 110 based on the selection made by the pilot, and the downlink request is sent to the ground center (ATC) for consideration (block 224). An uplink response is then sent back to the aircraft from the ground center (block 226), confirming that the alternative predicted request is safe to execute subject to pilot review or further acceptance check.

Figure 3:
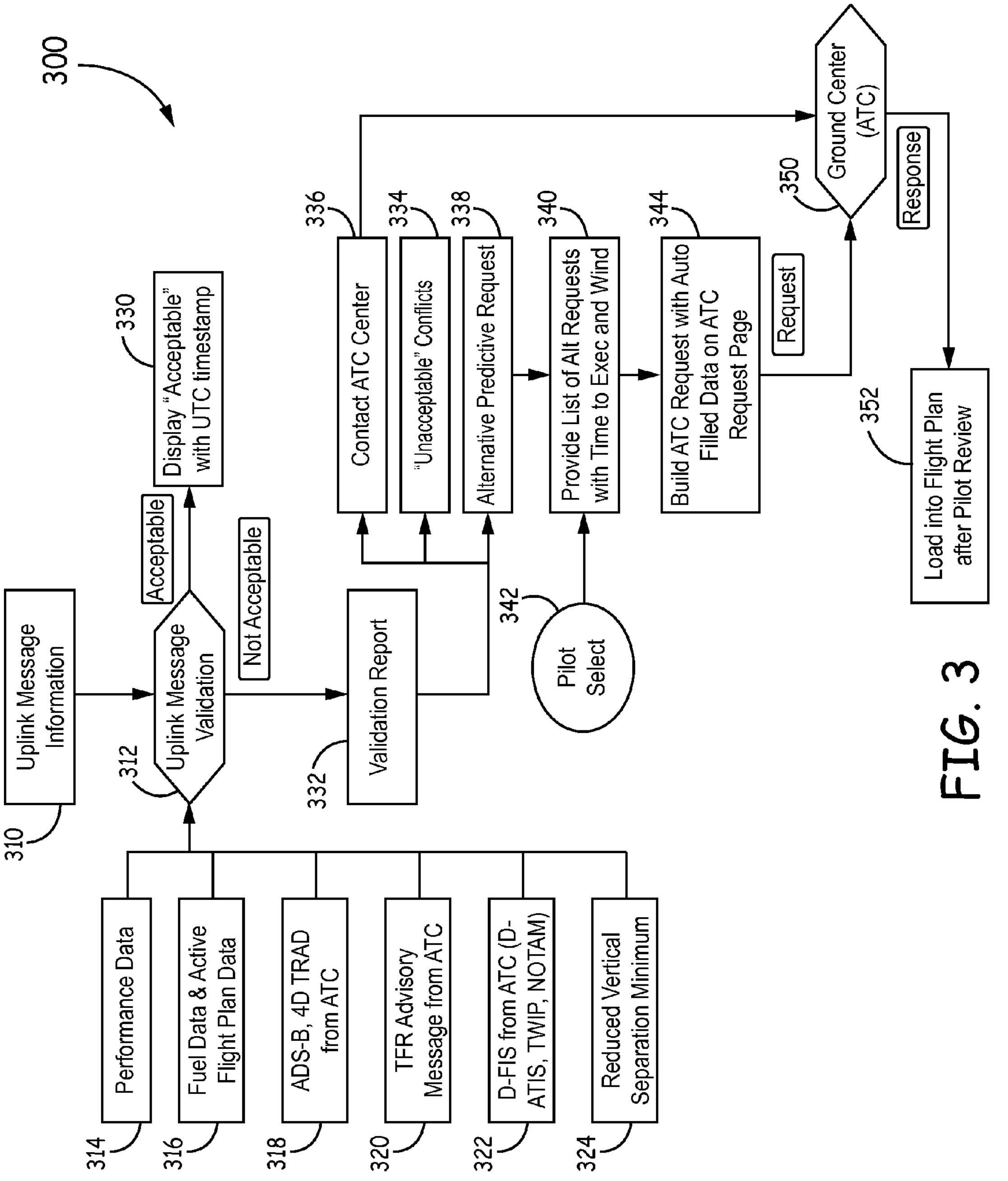
FIG. 3 is a flow diagram showing further details of a method for validating uplink messages during flight of an aircraft, according to one embodiment.

FIG. 3 is a flow diagram of a method 300, which illustrates further details of the operations used to validate uplink messages. Initially, uplink message information is received by the aircraft at 310, and sent to an uplink validation unit 312. The uplink validation unit 312 also receives dynamic information from various data sources. The dynamic information can include, for example, performance data (block 314), fuel data and active flight plan data (block 316), ADS-B and 4D TRAD from ATC (block 318), TFR advisory message from ATC (block 320), D-FIS from ATC (D-ATIS, TWIP, NOTAM) (block 322), and Reduced Vertical Separation Minimum data (block 324), as well as any other available dynamic information.

If uplink validation unit 312 determines that the uplink message information is acceptable, then the HMI displays "ACCEPTABLE" with a coordinated universal time (UTC) timestamp (block 330). If uplink validation unit 312 determines that the uplink message information is not acceptable, a validation report is generated (block 332), and the HMI displays an indication of "UNACCEPTABLE" conflicts (block 334), for example. The validation report can also display different choices for further action, such as contact ATC center (block 336), and alternative predictive request (block 338).

When alternative predictive request is selected, method 300 provides a list of alternative requests, with time to execute and wind data, for example (block 340). The pilot can then select one of the alternative requests for further action at 342. After selection, an ATC request is built with automatically filled data on an ATC request page (block 344). The ATC request is then sent to a ground center (ATC) (block 350). The ground center also receives the "contact ATC center" message from block 336 when selected. A response from the ground center is then sent back to the aircraft with a clearance having instructions that match the ATC request that can be executed after pilot review and confirmation (block 352).

An example implementation of a system to compute and validate an ATC loadable uplink message during the course of flight is described as follows. An exemplary flight plan for an aircraft, with A-F being the various waypoints along the flight path, can be expresses as:

A (3000 FT)→B (4000 FT)→C (5000 FT)→D (7000 FT)→E (8000 FT)→F (4000 FT).

In this example, the aircraft is currently flying the "B" waypoint at 4000 feet, and the ATC controller receives a bad weather report from a weather center. The report indicates that at the "E" waypoint at 8000 feet, a bad weather condition exists. Due to this condition, the ATC controller asks the aircraft to fly in a safer zone by providing a safe altitude at 7000 feet in an uplink message. When the uplink message is accepted, the pilot has the option to execute the uplink message at a later stage of the flight, since the "E" waypoint is still a ways along the flight path.

The present system provides a situational data display that depends on the dynamic condition of the aircraft flight. When the aircraft reaches the "D" waypoint, for example, the processing unit will start predicting whether the uplink altitude is still acceptable for the current position by getting the actual and predicted wind data, and other relevant information from one or more sensors, to give the output that the uplink altitude is safe to fly, or to notify the pilot that a request for a new altitude is needed.

Figure 4A:
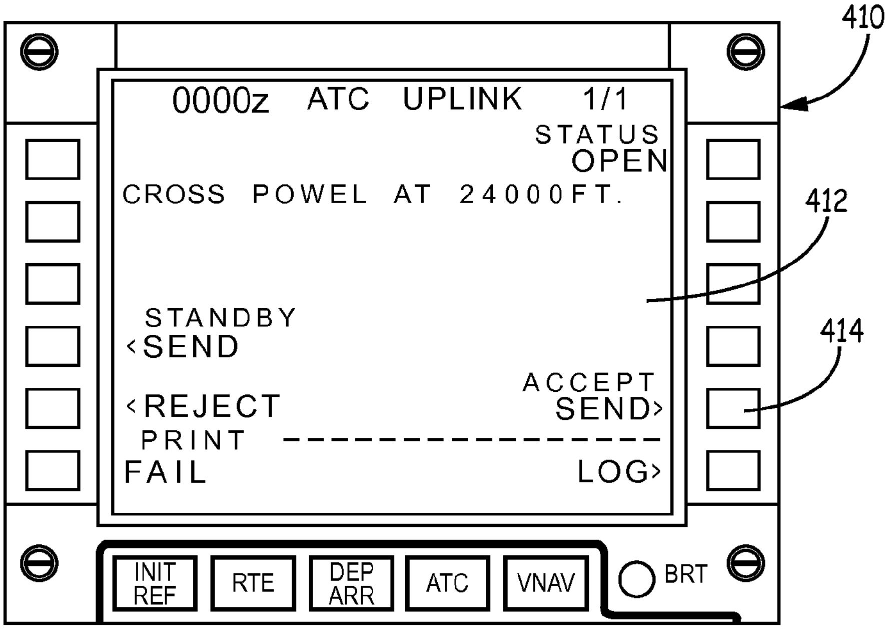
FIGS. 4A-4D illustrate an exemplary operation of a human machine interface (HMI) for an aircraft, which can be used in validating uplink constraints according to one approach.

FIGS. 4A-4D illustrate an exemplary operation of an HMI such as a control display unit 410 for an aircraft, which can be used in validating ATC uplink constraints according to one approach. In this example, the weather forecast system indicates that there will be bad weather at the waypoint "POWEL" at an altitude of 24000 feet. Hence, the ATC controller sends an uplink message to the aircraft, which is flying in the same zone. The message is shown on a screen 412 of control display unit 410 in the aircraft as "CROSS POWEL AT 24000FT" as depicted in FIG. 4A. The pilot can accept the uplink message by pushing a button 414 next to the "SEND" command on screen 412, which sends the acceptance to the ground center.

Figure 4B:
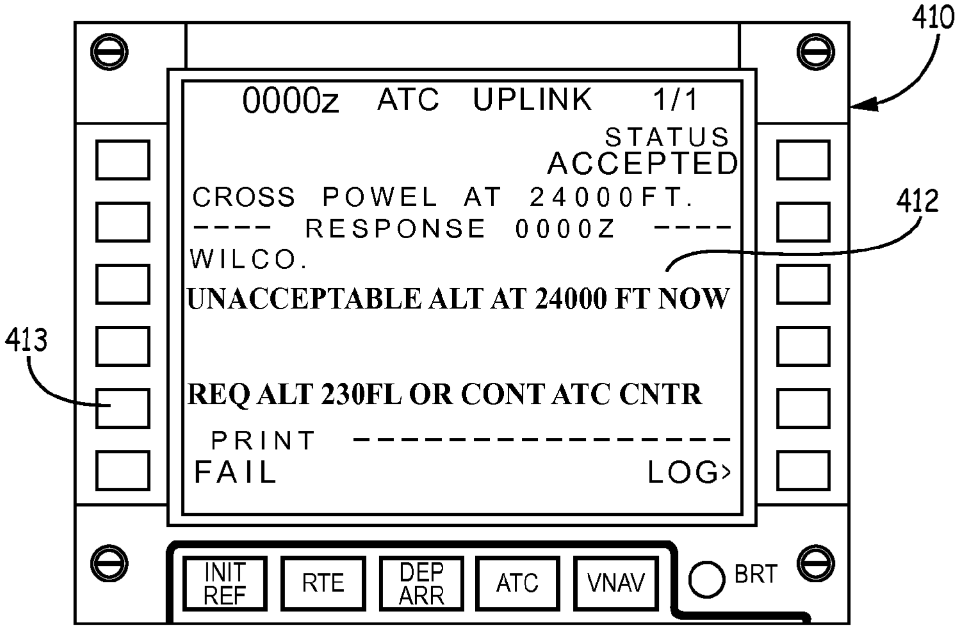

The processing unit is implemented with logic that compares the uplink information with dynamic information from various data sources, and predicts whether the uplink information is acceptable. In one approach, a validation report is displayed directly on an uplink page of control display unit 410. For example, once an initial uplink is accepted, if the uplink is determined to be unacceptable, control display unit 410 can show a text message indicating the uplink is not acceptable, such as "UNACCEPTABLE ALT AT 24000FT NOW" on screen 412, as depicted in FIG. 4B. Choices for further pilot action are also shown on screen 412, such as "REQ ALT 230FL OR CONT ATC CNTR" which provide for an alternative predictive request (altitude of 23000 feet) or contacting the ATC ground center. These can be selected by the pilot pushing a button 413 adjacent to screen 412.

Figure 4C:
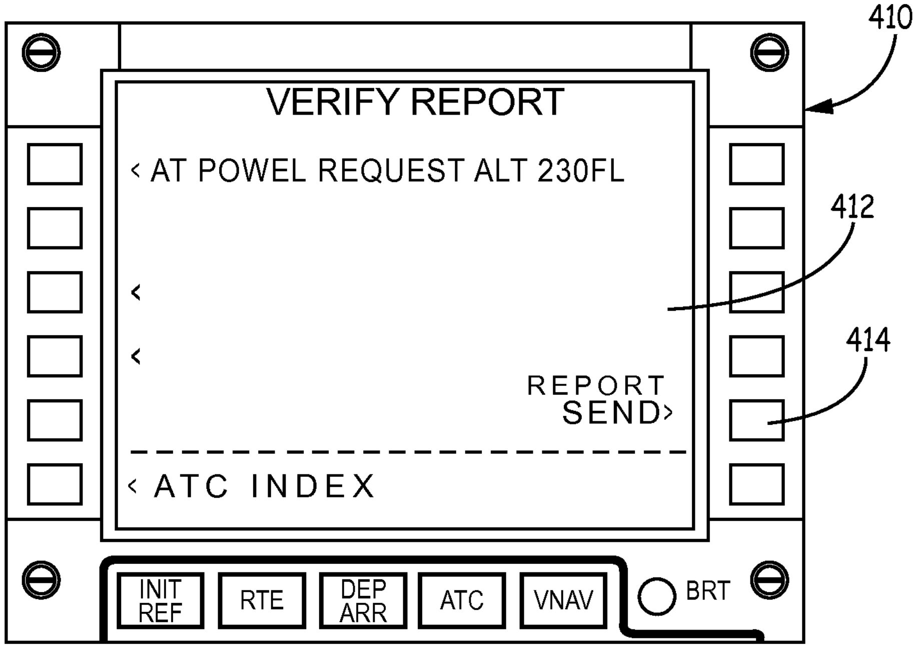

The pilot can then send an automatic message to the ATC ground center with the current information and a request for a new clearance altitude. For example, control display unit 410 can show the request, such as "AT POWEL REQUEST ALT 230FL" on screen 412, as depicted in FIG. 4C. The information and request can be sent automatically, or the pilot can take action on it, before sending by pushing button 414 next to the "SEND" command on screen 412. The ground center is then aware that the pilot is asking for a new clearance altitude that depends on the situation and dynamic condition of the flight. After approval from the ground center, the information from the request can be executed, for example.

Figure 4D:
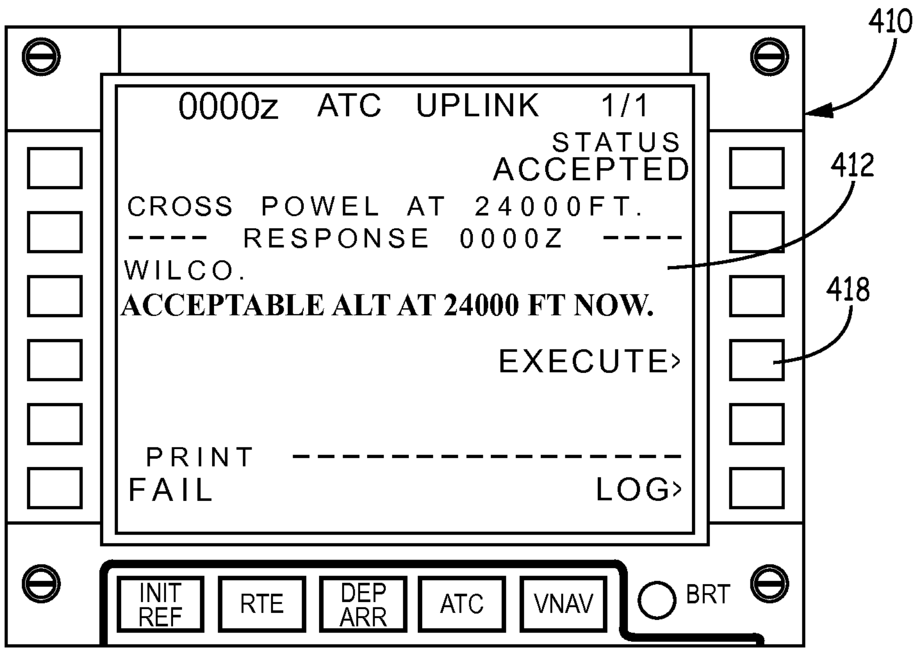

If the initial uplink is determined to be acceptable, display unit 410 can show a text message indicating the same, such as "ACCEPTABLE ALT AT 24000FT NOW" on screen 412, as depicted in FIG. 4D. The pilot can then proceed with loading and executing the uplink at this point by pushing a button 418 next to the "EXECUTE" command on screen 412.

Figure 5A:
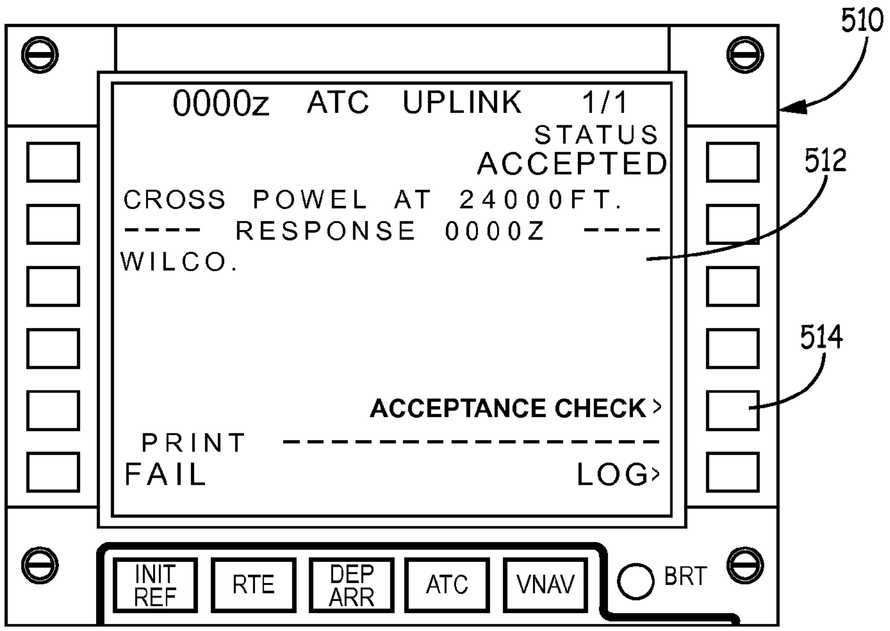
FIGS. 5A-5D illustrate an exemplary operation of an HMI for an aircraft, which can be used in validating uplink constraints according to another approach.

FIGS. 5A-5D illustrate an exemplary operation of a control display unit 510 for an aircraft, which can be used in validating ATC uplink constraints according to another approach. In this approach, a validation prompt can be displayed directly on an uplink page of a screen 512 of control display unit 510 for selection. For example, once an uplink has been accepted by the pilot, an "ACCEPTANCE CHECK" prompt shown on screen 512 can be selected by pushing an adjacent button 514, as depicted in FIG. 5A. After the pilot pushes button 514, a page opens on control display unit 510 that shows the results of the validation.

Figure 5B:
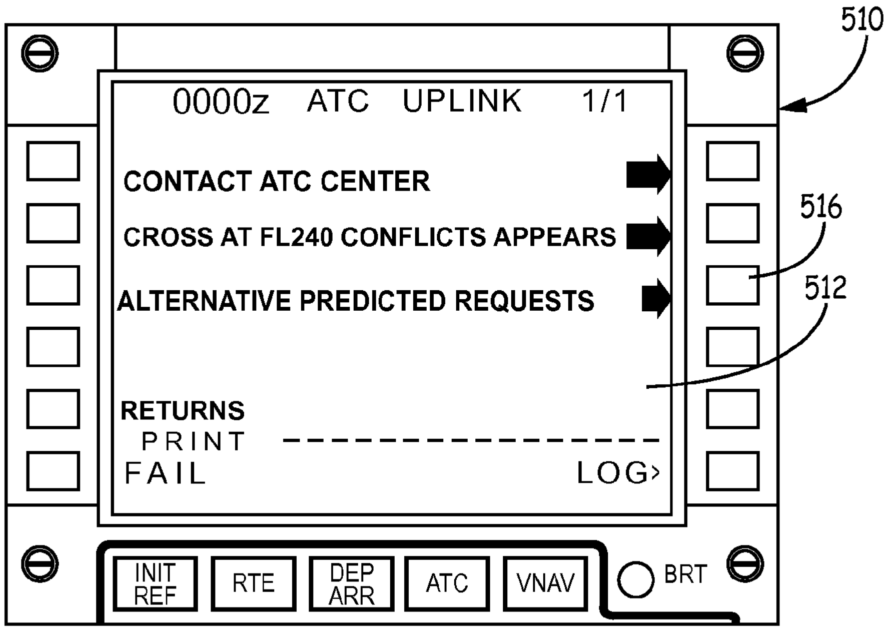
Figure 5C:
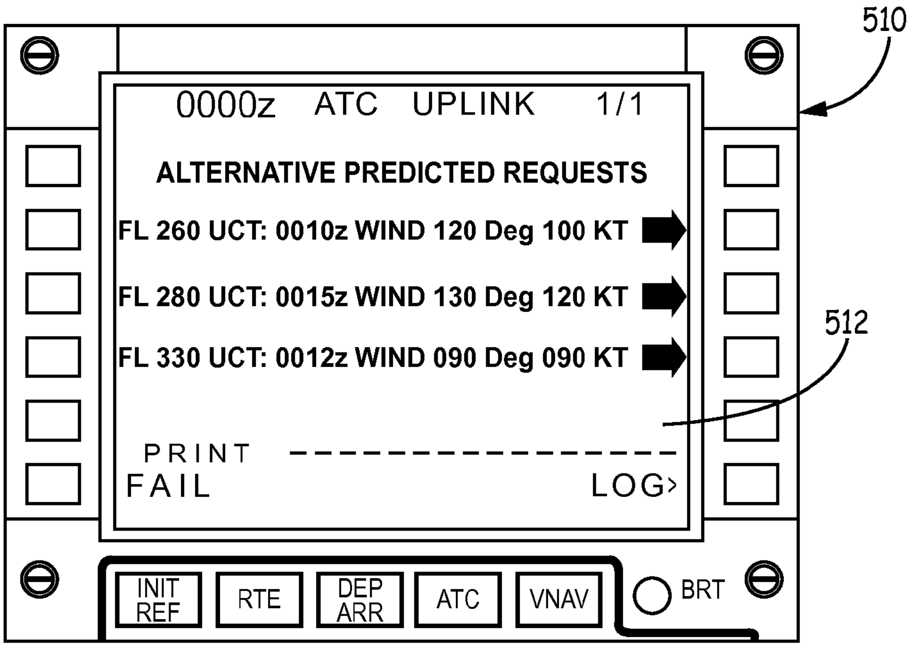
Figure 5D:
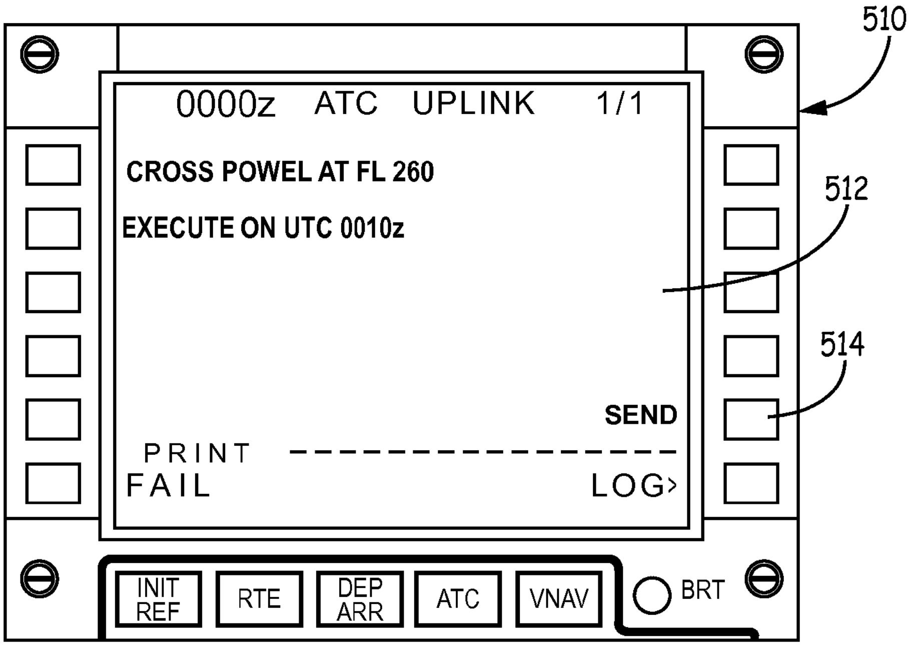

For example, if the uplink is unacceptable, a selectable list is shown on screen 512, such as "CONTACT ATC CENTER", "CROSS AT FL240 CONFLICTS APPEARS", and "ALTERNATIVE PREDICTED REQUESTS" as depicted in FIG. 5B. If the pilot pushes a button 516 associated with the alternative predicted requests, then the best available alternative predicted requests based on performance are displayed, along with time to execute and wind related information, so that the pilot can select and build a request. Exemplary alternative predicted requests that can be displayed for selection are shown on screen 512 in FIG. 5C.

Once the pilot selects the desired request from the list of alternative predicted requests, the processing unit automatically builds a request that is ready to send to the ground center. An exemplary built request that is ready to send is shown on screen 512 of control display unit 510 in FIG. 5D. The request is sent to the ground center after the pilot pushes button 514, which is now next to a "SEND" command on screen 512. After approval from the ground center, the information from the request is sent back to the aircraft as a clearance that can again be validated, loaded, and executed.

Again, if the initial ATC uplink is determined to be acceptable, control display unit 510 can show a message that the uplink is acceptable. The pilot can then proceed with executing the uplink.

As described previously, a visual representation can be generated on the situation display of an aircraft to show a pending uplink constraint, or a downlink request sent to the ground center. The uplink constraint or downlink request can be shown against any existing constraint value on the situation display, with a particular color and symbology for the uplink constraint or downlink request.

Figure 6B:
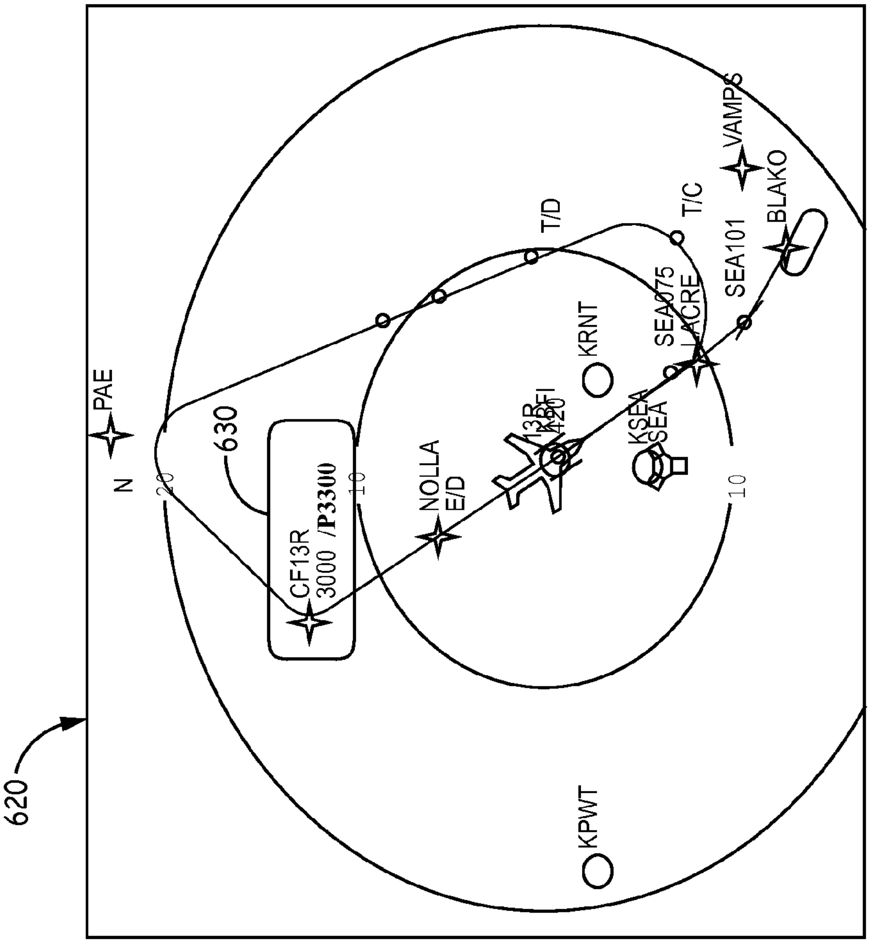
FIGS. 6A and 6B illustrate an exemplary operation of an HMI and a situation display for an aircraft, in which a visual representation of an uplink constraint is rendered on the situation display.
Figure 6A:
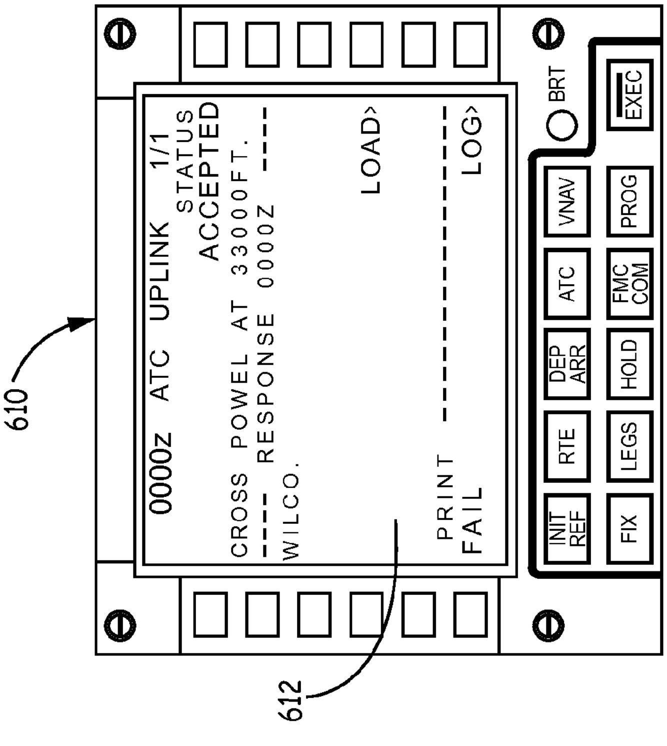

FIGS. 6A and 6B illustrate an exemplary operation of a control display unit 610 and an associated situation display such as a navigation display 620 for an aircraft, in which a visual representation of an ATC uplink constraint is rendered on navigation display 620. The control display unit 610 can show a pending uplink constraint on a screen 612 that is waiting to be loaded for a waypoint (CF13R), such as "CROSS CF13R AT 3300FT" as depicted in FIG. 6A. The navigation display 620 can also show a visual representation of the pending uplink constraint in conjunction with a current constraint value, such as "/P3300" after "CF13R 3000" at 630, as illustrated in FIG. 6B. Other examples of pending uplinked constraints that can be shown on navigation display 620 include "P3300A" to represent the uplinked constraint 3300FT AT or ABOVE PENDING, and "P3300B" to represent the uplinked constraint 3300FT AT or BELOW PENDING. While these examples use altitude as the constraint, this approach can be applied to any constraint that can be shown on navigation display 620.

Figure 7B:
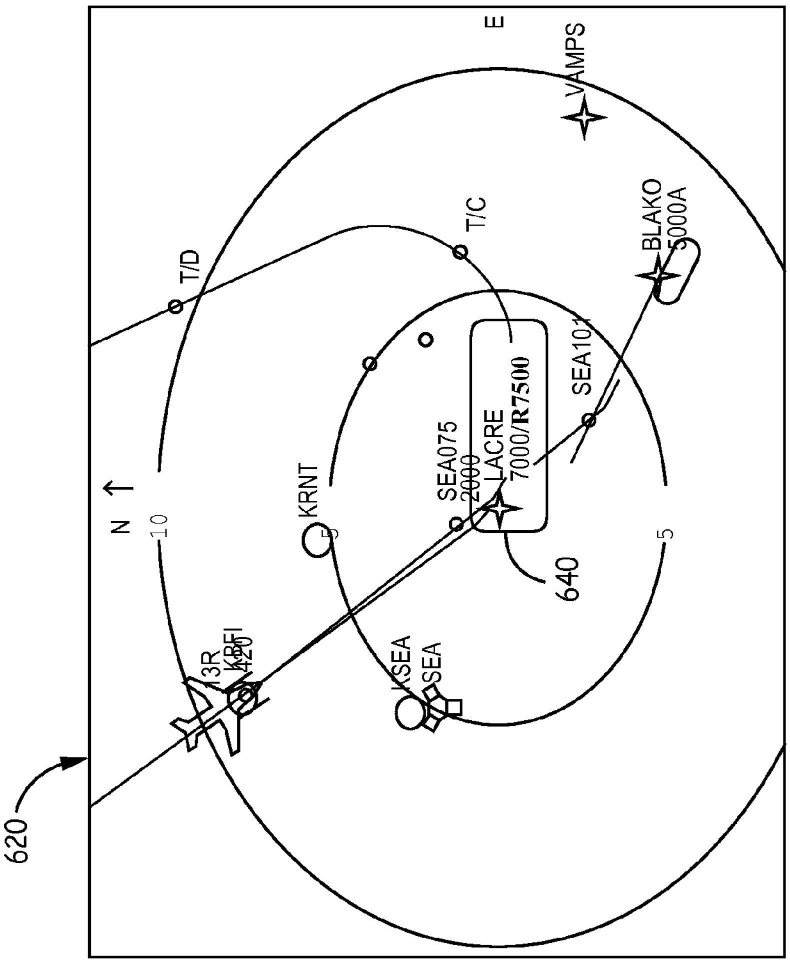
FIGS. 7A and 7B illustrate an exemplary operation of an HMI and a situation display, in which a visual representation of a downlink request is rendered on the situation display.
Figure 7A:
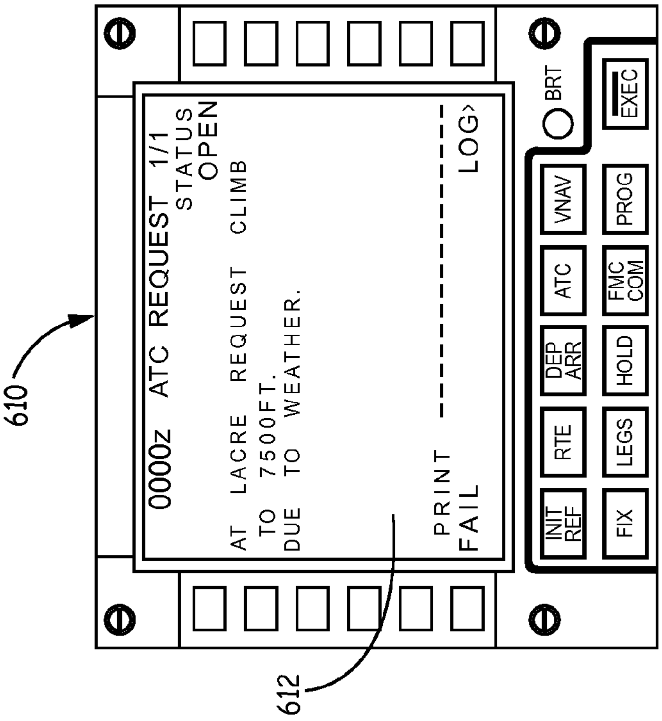

FIGS. 7A and 7B illustrate an exemplary operation of control display unit 610 and navigation display 620, in which a visual representation of an ATC downlink request is rendered on navigation display 620. The control display unit 610 can show a downlink request on screen 612 for a future waypoint (LACRE), such as "AT LACRE REQUEST CLIMB TO 7500FT. DUE TO WEATHER" as illustrated in FIG. 7A. The navigation display 620 can also show a representation of the downlink request in conjunction with a current constraint value, such as "/R7500" after "LACRE 7000" at 640, as illustrated in FIG. 7B.

Figure 8A:
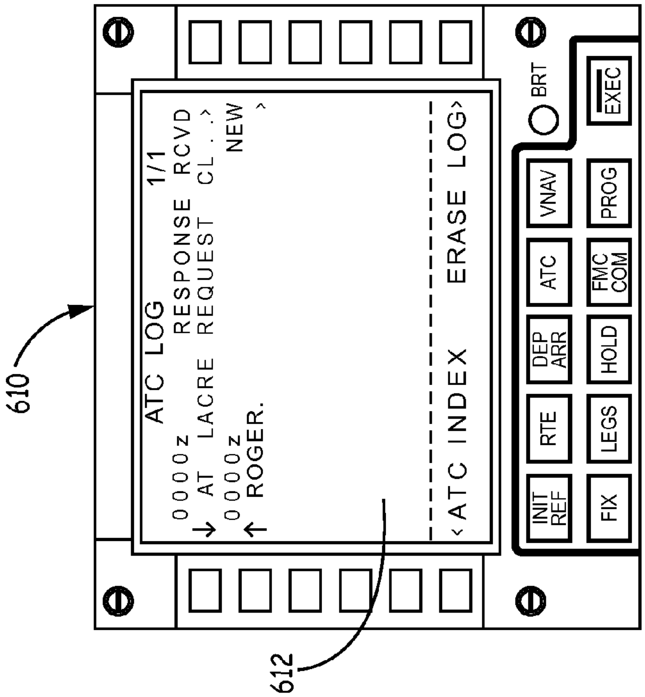
FIGS. 8A and 8B illustrate an exemplary operation of an HMI and a situation display, in which a visual representation of an approved downlink request is rendered on the situation display.
Figure 8B:
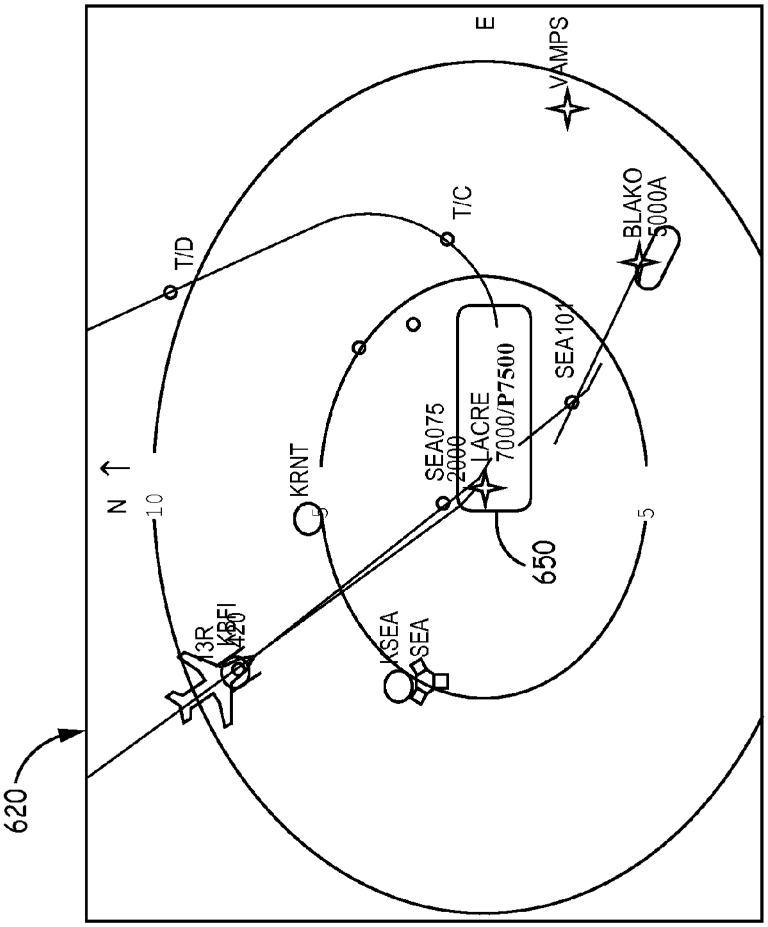

After the downlink request is sent to the ground center, an ATC controller will approve the request or send a new constraint to the aircraft. For example, as illustrated in FIG. 8A, if the ATC controller approves the request, control display unit 610 shows the approval, such as by a "ROGER" on screen 612, to indicate that the information in the request can be loaded into the flight plan. The navigation display 620 changes the representation of the downlink request that is now approved to a pending constraint shown in conjunction with the current constraint, such as "/P7500" after "LACRE 7000" at 650, as illustrated in FIG. 8B, indicating that the pending constraint is ready to be loaded.

A computer or processor used in the present system and method can be implemented using software, firmware, hardware, or any appropriate combination thereof, as known to one of skill in the art. These may be supplemented by, or incorporated in, specially-designed application-specific integrated circuits (ASICs) or field programmable gate arrays (FPGAs). The computer or processor can also include functions with software programs, firmware, or other computer readable instructions for carrying out various process tasks, calculations, and control functions used in the present method and system.

The present methods can be implemented by computer executable instructions, such as program modules or components, which are executed by at least one processor. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer- or processor-readable instructions. These instructions are typically stored on any appropriate computer program product that includes a computer readable medium used for storage of computer readable instructions or data structures. Such a computer readable medium can be any available media that can be accessed by a general purpose or special purpose computer or processor, or any programmable logic device.

Suitable processor-readable media may include storage or memory media such as magnetic or optical media. For example, storage or memory media may include conventional hard disks, compact disks, DVDs, Blu-ray discs, or other optical storage disks; volatile or non-volatile media such as Random Access Memory (RAM); Read Only Memory (ROM), Electrically Erasable Programmable ROM (EEPROM), flash memory, and the like; or any other media that can be used to carry or store desired program code in the form of computer executable instructions or data structures.

EXAMPLE EMBODIMENTS

Example 1 includes a system for dynamically validating uplink messages during flight, the system comprising: at least one processing unit in an aircraft; at least one communication device in the aircraft and operatively connected to the processing unit, the communication device configured to receive uplink messages from a ground air traffic control (ATC) center, and transmit downlink messages to the ground ATC center; a human machine interface (HMI) in the aircraft and operatively connected to the processing unit, the HMI configured to receive input from a user and display information to the user; and one or more data sources that provide dynamic information, the one or more data sources in operative communication with the processing unit; wherein the processing unit is configured to determine whether an ATC uplink message is acceptable based on analysis of the dynamic information from the one or more data sources.

Example 2 includes the system of Example 1, wherein if the processing unit determines that the ATC uplink message is acceptable, the HMI displays a visual indication to a user that the uplink message is acceptable.

Example 3 includes the system of Example 2, wherein if the processing unit determines that the uplink message is unacceptable, the HMI is configured to display a visual indication that the uplink message is unacceptable, and display one or more alternative predictive requests for selection.

Example 4 includes the system of Example 3, wherein the processing unit generates a downlink request based on the selected alternative predictive request; and the communication device sends the downlink request to the ground ATC center, and receives an uplink response from the ground ATC center.

Example 5 includes the system of any of Examples 1-4, wherein the processing unit is implemented independently, or as part of a flight management system (FMS), a communication management function (CMF), or a communications management unit (CMU).

Example 6 includes the system of any of Examples 1-5, wherein the communication device is configured to communicate controller pilot data link communications (CPDLC) messages between the ground ATC center and the aircraft.

Example 7 includes the system of any of Examples 1-6, wherein the HMI comprises a control display unit (CDU), a multifunction control and display unit (MCDU), a multi-input interactive display unit (MIDU), or a multi-function display (MFD).

Example 8 includes the system of any of Examples 1-7, wherein the data sources comprise sources of air traffic data, weather data, fuel data, aircraft performance data, or active flight plan data.

Example 9 includes the system of any of Examples 1-8, further comprising a situation display in the aircraft and operatively connected to the processing unit, the situation display configured to render a visual representation of a pending uplink constraint that is approved for executing; and render a visual representation of a downlink request sent to the ground ATC center.

Example 10 includes the system of Example 9, wherein the situation display comprises a navigation display, or a vertical situation display.

Example 11 includes a method for dynamically validating uplink messages during flight, the method comprising: receiving an uplink message in an aircraft from a ground air traffic control (ATC) center; receiving dynamic information from one or more data sources inside or outside of the aircraft; processing the dynamic information with respect to the uplink message to determine whether the uplink message is acceptable; if the uplink message is acceptable, displaying a visual indication that the uplink message is acceptable; if the uplink message is unacceptable, displaying a visual indication that the uplink message is unacceptable, displaying one or more alternative predictive requests for selection, generating a downlink request based on the selected alternative predictive request, and sending the downlink request to the ground ATC center.

Example 12 includes the method of Example 11, further comprising receiving an uplink response to the downlink request from the ground ATC center.

Example 13 includes the method of any of Examples 11-12, wherein the uplink message comprises a controller pilot data link communications (CPDLC) message.

Example 14 includes the method of any of Examples 11-13, wherein the dynamic information comprises air traffic data, weather data, fuel data, aircraft performance data, active flight plan data, reduced vertical separation minimum data, ATC services data, notice to airmen (NOTAM), temporary flight restriction (TFR), system wide information management (SWIM), 4D flight plan data, 4D trajectory data link, traffic collision avoidance system (TCAS), automatic dependency surveillance-broadcast (ADS-B), digital flight information service (D-FIS), terminal weather information for pilots (TWIP), or digital automatic terminal information service (D-ATIS).

Example 15 includes the method of any of Examples 11-14, wherein the dynamic information is processed by a processing unit that is implemented independently, or as part of a flight management system (FMS), a communication management function (CMF), or a communications management unit (CMU).

Example 16 includes the method of any of Examples 11-15, wherein the visual indications are displayed on a human machine interface (HMI) in the aircraft.

Example 17 includes the method of any of Examples 11-16, further comprising rendering a visual representation on a situation display of a pending uplink constraint.

Example 18 includes the method of any of Examples 11-16, further comprising rendering a visual representation on a situation display of a downlink request sent to the ground ATC center.

Example 19 includes the method of any of Examples 11-18, further comprising rendering a visual representation on a situation display that the uplink message is acceptable or unacceptable.

Example 20 includes a system for rendering messages during flight, the system comprising: at least one processing unit in an aircraft; at least one communication device in the aircraft and operatively connected to the processing unit, the communication device configured to receive uplink messages from a ground air traffic control (ATC) center and transmit downlink messages to the ground ATC center; and a situation display in the aircraft and operatively connected to the processing unit, the situation display configured to display a visual representation of a flight plan of the aircraft; wherein the situation display is configured to render a visual representation of a pending uplink constraint, and render a visual representation of a downlink request sent to the ground ATC center.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A system for dynamically validating uplink messages during flight, the system comprising:

at least one processing unit in an aircraft;

at least one communication device in the aircraft and operatively connected to the processing unit, the communication device configured to receive uplink messages from a ground air traffic control (ATC) center, and transmit downlink messages to the ground ATC center;

a human machine interface (HMI) in the aircraft and operatively connected to the processing unit, the HMI configured to receive input from a user and display information to the user; and one or more data sources that provide dynamic information, the one or more data sources in operative communication with the processing unit;

wherein the processing unit is configured to automatically determine whether an ATC uplink message is acceptable based on analysis of the dynamic information from the one or more data sources.

2. The system of claim 1, wherein if the processing unit determines that the ATC uplink message is acceptable, the HMI displays a visual indication to a user that the uplink message is acceptable.

3. The system of claim 1, wherein if the processing unit determines that the uplink message is unacceptable, the HMI is configured to:

display a visual indication that the uplink message is unacceptable; and display one or more alternative predictive requests for selection.

4. The system of claim 3, wherein:

the processing unit generates a downlink request based on the selected alternative predictive request; and the communication device sends the downlink request to the ground ATC center, and receives an uplink response from the ground ATC center.

5. The system of claim 1, wherein the processing unit is implemented independently, or as part of a flight management system (FMS), a communication management function (CMF), or a communications management unit (CMU).

6. The system of claim 1, wherein the communication device is configured to communicate controller pilot data link communications (CPDLC) messages between the ground ATC center and the aircraft.

7. The system of claim 1, wherein the HMI comprises a control display unit (CDU), a multifunction control and display unit (MCDU), a multi-input interactive display unit (MIDU), or a multi-function display (MFD).

8. The system of claim 1, wherein the data sources comprise sources of air traffic data, weather data, fuel data, aircraft performance data, or active flight plan data.

9. The system of claim 1, further comprising a situation display in the aircraft and operatively connected to the processing unit, the situation display configured to:

render a visual representation of a pending uplink constraint that is approved for executing; and render a visual representation of a downlink request sent to the ground ATC center.

10. The system of claim 9, wherein the situation display comprises a navigation display, or a vertical situation display.

11. A method for dynamically validating uplink messages during flight, the method comprising:

receiving an uplink message in an aircraft from a ground air traffic control (ATC) center;

receiving dynamic information from one or more data sources inside or outside of the aircraft;

processing the dynamic information with respect to the uplink message using a processing unit in the aircraft to automatically determine whether the uplink message is acceptable;

if the uplink message is acceptable:

displaying a visual indication that the uplink message is acceptable;

if the uplink message is unacceptable:

displaying a visual indication that the uplink message is unacceptable;

displaying one or more alternative predictive requests for selection;

generating a downlink request based on the selected alternative predictive request; and sending the downlink request to the ground ATC center.

12. The method of claim 11, further comprising receiving an uplink response to the downlink request from the ground ATC center.

13. The method of claim 11, wherein the uplink message comprises a controller pilot data link communications (CPDLC) message.

14. The method of claim 11, wherein the dynamic information comprises air traffic data, weather data, fuel data, aircraft performance data, active flight plan data, reduced vertical separation minimum data, ATC services data, notice to airmen (NOTAM), temporary flight restriction (TFR), system wide information management (SWIM), 4D flight plan data, 4D trajectory data link, traffic collision avoidance system (TCAS), automatic dependency surveillance-broadcast (ADS-B), digital flight information service (D-FIS), terminal weather information for pilots (TWIP), or digital automatic terminal information service (D-ATIS).

15. The method of claim 11, wherein the processing unit is implemented independently, or as part of a flight management system (FMS), a communication management function (CMF), or a communications management unit (CMU).

16. The method of claim 11, wherein the visual indications are displayed on a human machine interface (HMI) in the aircraft.

17. The method of claim 11, further comprising rendering a visual representation on a situation display of a pending uplink constraint.

18. The method of claim 11, further comprising rendering a visual representation on a situation display of a downlink request sent to the ground ATC center.

19. The method of claim 16, further comprising rendering a visual representation on a situation display that the uplink message is acceptable or unacceptable.

20. A system for rendering messages during flight, the system comprising:

at least one processing unit in an aircraft;

at least one communication device in the aircraft and operatively connected to the processing unit, the communication device configured to receive uplink messages from a ground air traffic control (ATC) center and transmit downlink messages to the ground ATC center;

one or more data sources that provide dynamic information, the one or more data sources in operative communication with the processing unit; and a situation display in the aircraft and operatively connected to the processing unit, the situation display configured to display a visual representation of a flight plan of the aircraft;

wherein the situation display is configured to:

render a visual representation of a pending uplink constraint; and render a visual representation of a downlink request sent to the ground ATC center;

wherein the processing unit is configured to automatically determine whether an ATC uplink message is acceptable based on analysis of the dynamic information from the one or more data sources.

* * * * *